March 1, 1949.  F. C. GHISLETTA  2,463,167
GRAPEFRUIT SEGMENTING AND DE-RINDING DEVICE
Filed April 7, 1947  2 Sheets-Sheet 1

Inventor
Franklin C. Ghisletta

By *Clarence A. O'Brien and Harvey B. Jacobson*
Attorneys

March 1, 1949.    F. C. GHISLETTA    2,463,167
GRAPEFRUIT SEGMENTING AND DE-RINDING DEVICE
Filed April 7, 1947    2 Sheets-Sheet 2
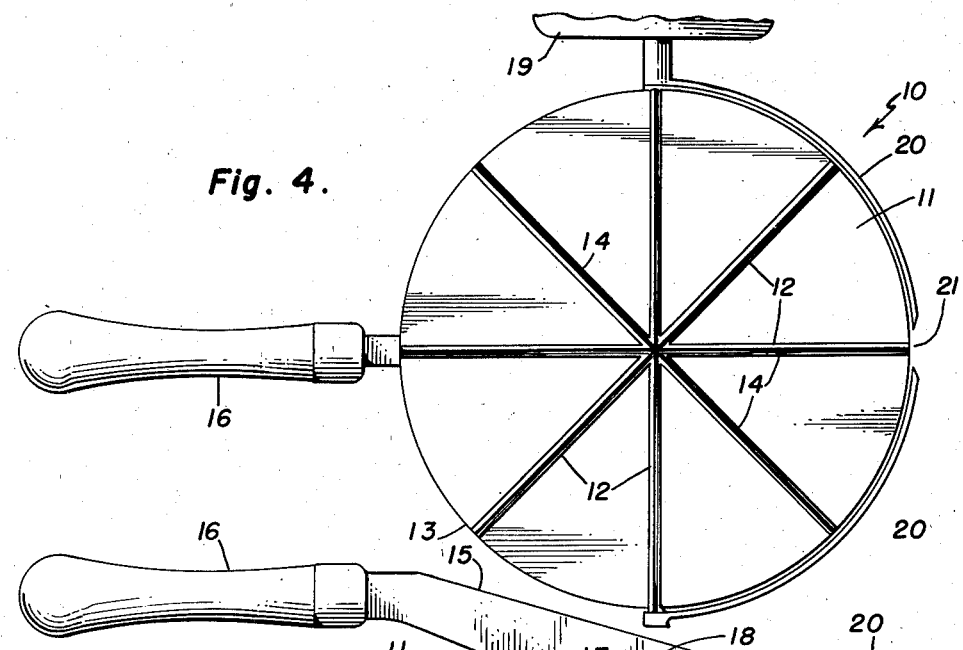
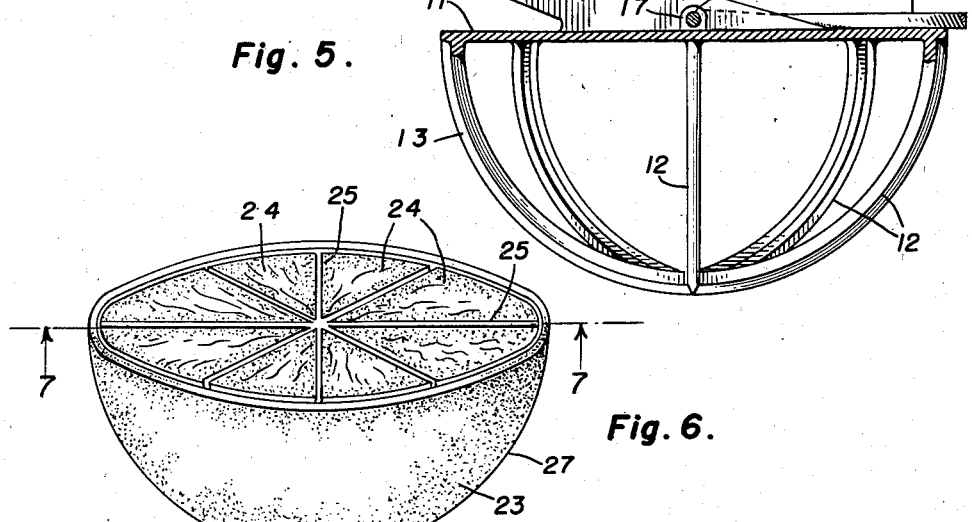
Inventor
Franklin C. Ghisletta
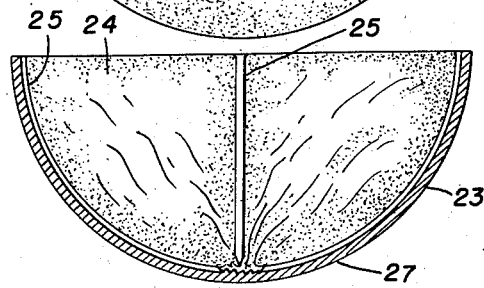
Attorneys Patented Mar. 1, 1949

2,463,167

UNITED STATES PATENT OFFICE 2,463,167

GRAPEFRUIT SEGMENTING AND DERINDING DEVICE

Franklin C. Ghisletta, Patterson, Calif.

Application April 7, 1947, Serial No. 739,845

1 Claim. (Cl. 146—3)

This invention relates new and useful improvements and structural refinements in grapefruit preparing devices, and the principal object of the invention is to provide a device of the character herein described which may be conveniently and effectively employed for separating the edible portion or "meat" of the grapefruit from the "skin" or rind and for simultaneously dividing that edible portion into a plurality of conveniently sized sections or segments, after the grapefruit has been cut in half in the conventional manner.

A further object of the invention is to provide a grapefruit preparing device which may be quickly and easily manipulated and which will leave the grapefruit in a conveniently prepared condition for subsequent consumption.

Another object of the invention is to provide a grapefruit preparing device which is simple in construction, which will not easily become damaged, and which will readily lend itself to economical manufacture.

An additional object of the invention is to provide a grapefruit preparing device which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 4 is an under-side plan view of the subject shown in Figure 1;

Figure 5 is a cross-sectional view, taken substantially in the plane of the line 5—5 in Figure 1;

Figure 6 is a perspective view showing one-half of a grapefruit prepared by the use of the invention, and;

Figure 7 is a cross-sectional view, taken substantially in the plane of the line 7—7 in Figure 6.

Like characters of reference are used to designate like parts in the specification and throughout the several views.

Figure 1:
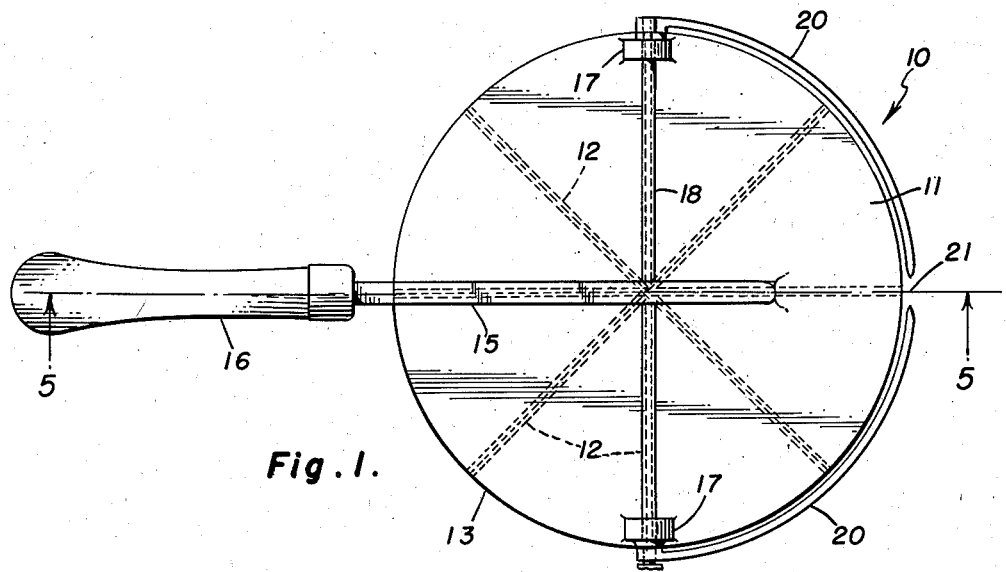
Figure 1 is a top plan view of the invention.
Figure 2:
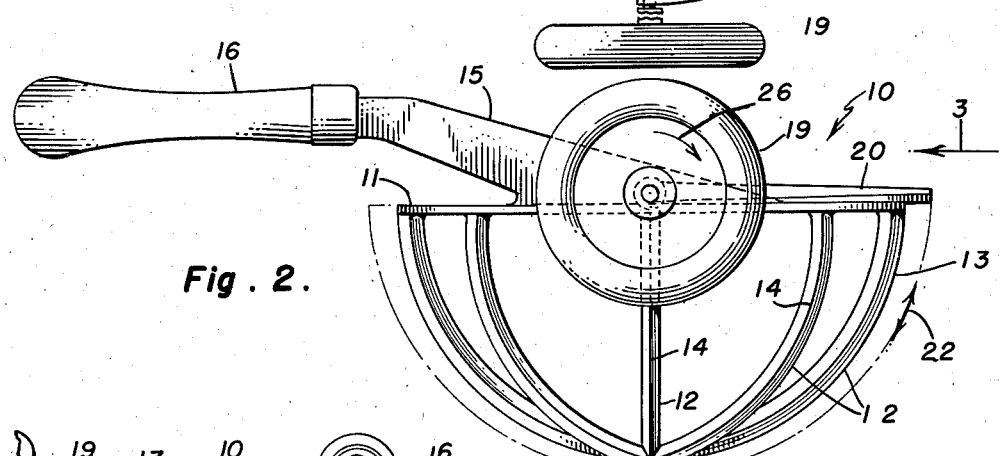
Figure 2 is a side elevation thereof.
Figure 3:
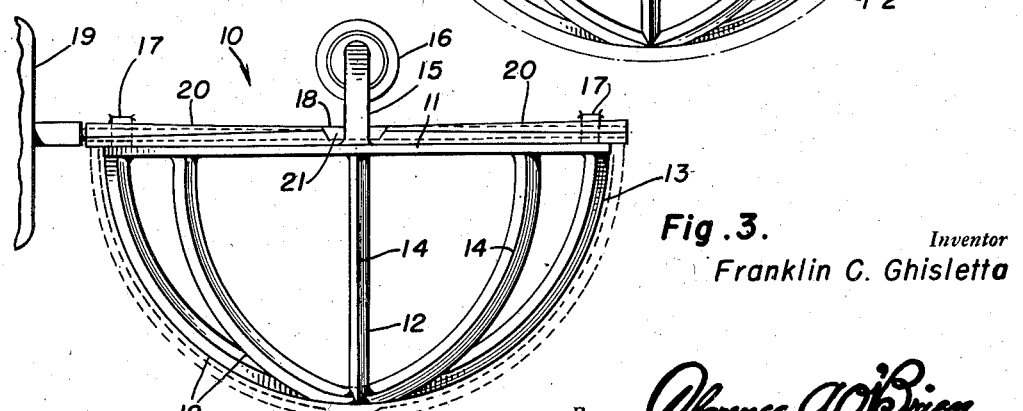
Figure 3 is an end view, taken in the direction of the arrow 3 in Figure 2.

Referring now to the accompanying drawings in detail, the invention consists of a grapefruit preparing device designated generally by the reference character 10, the same embodying in its construction a circular plate 11 and a plurality of arcuate blades 12 which are secured at the ends thereof to one side of the plate 11 and coact therewith to form what may be referred to as a substantially semi-spherical skeleton 13.

It will be noted that the blades 12 are of a substantially "semi-circular" configuration and that they are bevelled to provide sharp cutting edges 14, as will be clearly apparent.

An outwardly projecting strip or plate 15 is secured in any suitable manner to the upper surface of the plate 11, the strip 15 being provided at the outer extremity thereof with a suitable handle 16, whereby the entire device may be conveniently held while the preparation of the grapefruit is being undertaken.

The upper surface of the plate 11 is also equipped with a pair of spaced bearing blocks 17 and a diametrically extending shaft 18 is rotatably journalled in the blocks, such shaft carrying at one end thereof a suitable hand knob 19.

A pair of arcuate cutting knives 20 are secured to the relatively opposite end portions of the shaft 18, the knives 20 extending in a substantially semi-circular formation around the convex wall of the skeleton 13, as will be clearly understood.

It will be noted that the adjacent ends of the knives 20 are mutually spaced as indicated at 21, and it should be understood that the knives are swingable simultaneously around the concave blades 12, as indicated by the arrow 22.

When the invention is placed in use, the grapefruit is cut in half in the conventional manner as indicated at 23 in Figures 6 and 7, whereupon the device is pressed downwardly into the grapefruit, so that the blades 12 separate the edible portion or "meat" of the grapefruit into a plurality of sections or segments, as at 24. It should be understood that the slots or cuts which have been formed in the grapefruit by the blades 12 are indicated at 25.

Thereupon, by simply holding the handle 16 in one hand and rotating the knob 19 in the direction of the arrow 26 with the other, the knives 20 will be caused to swing around the blades 12, as has been already described, thereby separating the edible portion of the grapefruit from the "skin" or rind 27.

In this manner, the grapefruit will be conveniently prepared for subsequent use, but it should be pointed out that by virtue of the spacing 21 between the knives 20, a substantially "semi-circular" band will remain in connecting the edible portion of the grapefruit to the rind, whereby complete displacement of the edible portion will be prevented.

It is believed that the advantages and use of the invention will be clearly understood from the foregoing disclosure and accordingly, further description at this point thereof is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A grapefruit segmenting and derinding device, comprising a circular plate, a set of arcuate cutting ribs extending from the marginal edge of said plate in convergent relation and having their convergent ends connected together, said ribs coacting with said plate to form a semi-spherical frame, a pair of bearing blocks provided at diametrically opposite edges of said plate, a shaft parallel to the diameter of said plate and rotatably journalled in said blocks, a handle secured to and extending laterally from said plate substantially at right angles to said shaft, a pair of arcuate knives each secured at one end thereof to one end portion of said shaft, said knives extending in spaced relation over said ribs and having spaced opposing free ends, and a hand knob secured to one end of said shaft whereby said knives may be swung over said ribs on an axis parallel to said plate.

FRANKLIN C. GHISLETTA.

REFERENCES CITED

The following references are of record in the file of this patent:

UNITED STATES PATENTS

| Number | Name | Date |
|---|---|---|
| 921,917 | Troxell | May 18, 1909 |
| 1,423,490 | Vafiades et al. | July 18, 1922 |
| 1,631,854 | Carroll | June 7, 1927 |

FOREIGN PATENTS

| Number | Country | Date |
|---|---|---|
| 388,933 | Great Britain | Mar. 9, 1933 |